US007298864B2

(12) United States Patent
Jones

(10) Patent No.: US 7,298,864 B2
(45) Date of Patent: Nov. 20, 2007

(54) DIGITAL WATERMARKS AS A GATEWAY AND CONTROL MECHANISM

(75) Inventor: Kevin C. Jones, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1090 days.

(21) Appl. No.: 09/784,391

(22) Filed: Feb. 15, 2001

(65) Prior Publication Data

US 2001/0046069 A1    Nov. 29, 2001

Related U.S. Application Data

(60) Provisional application No. 60/183,681, filed on Feb. 19, 2000.

(51) Int. Cl.
*G06K 9/00* (2006.01)
(52) U.S. Cl. ............... 382/100; 715/751; 715/752; 713/176
(58) Field of Classification Search ............ 382/100; 713/176; 705/50–80, 62; 358/3.28; 283/112, 283/113; 715/751–752
See application file for complete search history.

(56) References Cited

U.S. PATENT DOCUMENTS

| 5,841,978 | A | | 11/1998 | Rhoads .......... 395/200.47 |
| 5,862,260 | A | * | 1/1999 | Rhoads .......... 382/232 |
| 5,956,716 | A | | 9/1999 | Kenner et al. ......... 707/10 |
| 5,958,005 | A | * | 9/1999 | Thorne et al. ........ 709/202 |
| 6,122,403 | A | | 9/2000 | Rhoads |
| 6,141,753 | A | * | 10/2000 | Zhao et al. ......... 713/176 |
| 6,243,480 | B1 | | 6/2001 | Zhao et al. |
| 6,421,070 | B1 | | 7/2002 | Ramos et al. |
| 6,615,348 | B1 | * | 9/2003 | Gibbs .......... 713/162 |
| 6,868,498 | B1 | * | 3/2005 | Katsikas .......... 726/14 |
| 7,000,186 | B1 | * | 2/2006 | Gropper et al. ......... 715/537 |
| 2001/0005837 | A1 | | 6/2001 | Kojo |
| 2001/0026377 | A1 | | 10/2001 | Ikegami .......... 358/401 |
| 2001/0056468 | A1 | | 12/2001 | Okayasu et al. |
| 2003/0023682 | A1 | * | 1/2003 | Brown et al. ......... 709/204 |

FOREIGN PATENT DOCUMENTS

| EP | 0375138 A2 | * | 6/1990 |
| EP | 1 063 833 A2 | | 12/2000 |
| EP | 1193925 A2 | * | 4/2002 |
| JP | 2000-057327 | * | 2/2000 |
| JP | 2003-092605 | * | 3/2003 |
| WO | WO02/27617 | | 4/2002 |

OTHER PUBLICATIONS

Matsutani et al., "Tghe Construction of Copyright-Protected Image Data", Technical Report of IEICE, ISEC94-58, Mar. 17, 1995, 20 pages.

* cited by examiner

*Primary Examiner*—Matthew C. Bella
*Assistant Examiner*—Shefali Patel

(57) ABSTRACT

An electronic e-mail system where messages contain information carried by digital watermarks. The digital watermarks are used to control the transmission and/or receipt of documents transmitted over system. The invention can be used to prevent the accidental dissemination of information to unauthorized receivers. Furthermore, while no security system is fool-proof, the present invention helps guards against the intentional, but unauthorized, dissemination of confidential information to unauthorized receivers.

12 Claims, 4 Drawing Sheets

DIGITAL WATERMARKS AS A GATEWAY AND CONTROL MECHANISM

RELATED APPLICATION

Applicant claims priority of co-pending application 60/183,681 filed Feb. 19, 2000 entitled "Digital Watermarks as a Gateway and Control Mechanism".

FIELD OF THE INVENTION

The present invention relates to Internet communication and more particularly to using digital watermarks as control elements in Internet communication.

BACKGROUND OF THE INVENTION

The Internet presents security challenges to corporations and others who have computers that store confidential information and that have connections to the Internet. Traditionally, documents containing confidential information are marked with a legend or other visual indicia with words such a "CONFIDENTIAL", "PROPRIETARY", etc. The presence of these marks alert anyone handling such documents that they should only be transferred outside of company under special precautions. It is relatively difficult and unusual for someone to manually send such a document to an unauthorized receiver inadvertently. However, the use of Internet communication changes the situation.

The Internet and electronic mail speeds the communications process; however, the Internet and electronic mail also make it much easier to inadvertently or accidentally send a confidential document to an unauthorized receiver. A single accidental or inadvertent keystroke can have wide ranging unintended consequences. The Internet and other electronic communication systems make it easy to communicate; however, these systems and networks also make it easy to mistakenly or inadvertently send a document to the wrong party.

SUMMARY OF THE PRESENT INVENTION

The present invention utilizes digital watermarks to control the transmission and/or receipt of documents transmitted over computer networks such as the Internet. The invention can be used to prevent the accidental dissemination of information to unauthorized receivers. Furthermore, while no security system is fool-proof, the present invention helps guard against the intentional, but unauthorized, dissemination of confidential information to unauthorized receivers.

Most electronically transmitted messages contain text. However, electronic mail systems generally allow images (i.e. pictures) or sound bites to be embedded into and form part of a message. For example, a message can contain a "stamp" with the word "confidential" or a message can contain a sound clip with the word "confidential". An image or sound clip that forms part of an electronic message can carry a digital watermark that can be detected and read by conventional watermark reading programs.

The "payload" or digital data in a digital watermark typically has a number of different fields. One or more of these fields can be dedicated to a flags which indicates that the document or image containing the watermark is confidential or otherwise classified and that it should only be disseminated in a particular manor.

Typically, e-mail enters a transmission network by way of an e-mail server. Programs that can detect and read watermarks are well known and commercially available. With the present invention, the e-mail server passes each e-mail messages through a watermark detection and reading program prior to sending the message out over a network. If the watermark program detects a watermark, it interrogates certain flag bits to determine how the message should be handled. For example, if the watermark reading program finds that a particular flag is set, it can take action such as alerting both the sender and a network administrator. If the watermark program finds no watermark or finds that a particular flag is not set, the message is sent over the network in a conventional manner. Alternately, the message can be sent only if a particular flag is set.

Thus, the present invention can serve as a control mechanism for controlling the dissemination and receipt of electronic messages.

Messages and documents also enter the Internet and other electronic networks from servers such as Web servers and FTP servers. In a similar fashion a watermark detection program can interrogate documents on servers such as Web and FTP servers and take action as described above.

DESCRIPTION OF PREFERRED EMBODIMENTS

The embodiments of the invention described herein relate to systems for transmitting e-mail messages over the Internet. This first embodiment has the ability to prevent the accidental dissemination of confidential e-mail messages and documents to unauthorized users. That is, the first embodiment of the invention prevents the transmission of confidential e-mail or documents to anyone. An alternate embodiment merely prevent the transmission of confidential documents to "unauthorized" users. That is, if a message is sent to two recipients, one of whom is authorized and one of whom is not authorized, the documents are transmitted to authorized user and not transmitted to unauthorized user. It is very easy to add addressees to an e-mail message. Someone may address an e-mail message which contains confidential information to a large group of people without realizing the one of the addressee is not authorized to receive confidential information. The system of the present invention will prevent such an e-mail from being transmitted to the unauthorized person even though the sender included the address of that person in the list of addressee. Another alternative embodiment can take a variety of actions such as logging messages or sending them to an administrator in addition to preventing them from being disseminated.

Figure 1:
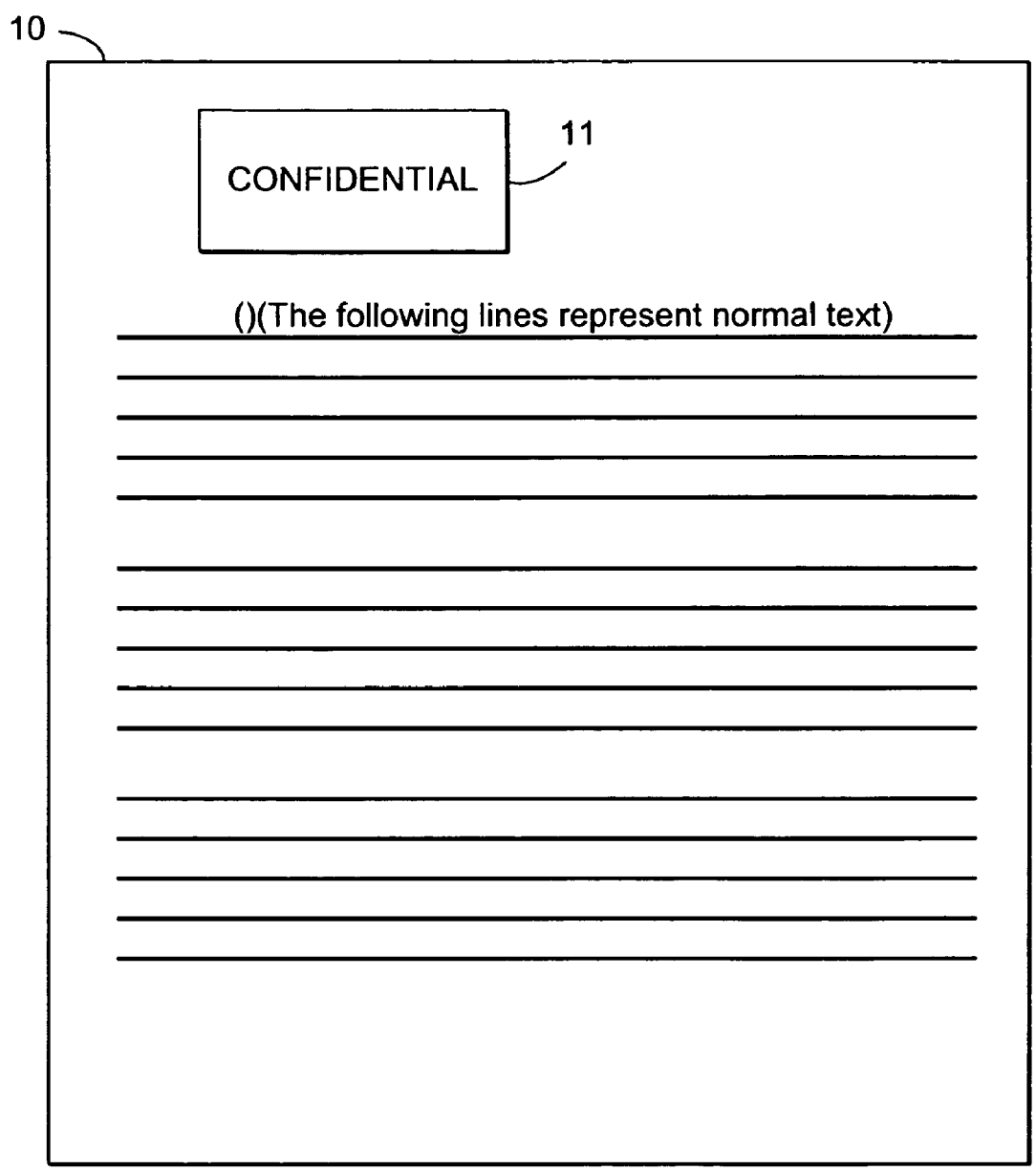
FIG. 1 is a diagram with an image containing the words "Confidential".

A typical confidential document 10 is represented in FIG. 1. The document 10 can either be an e-mail message, or alternatively it may be a document that is attached to an e-mail message. The document 10 includes a confidentiality stamp 11 and lines of text. The confidentiality stamp 11 is an image that has the word "confidential" superimposed over a background that has a variety of lines. That is, the background in image 11 contains lines the width of which are varied to carry a watermark in accordance with the teachings of U.S. application Ser. No. 09/074,034, filed May 6, 1998, now U.S. Pat. No. 6,449,377, (which corresponds to PCT application PCT/US99/08252 (WO99/53428)), and US application Ser. No. 09/127,502, filed Jul. 31, 1998 now U.S. Pat. No. 6,345,104 (which corresponds to PCT application PCT/US99/14532 (WO00/07356)). The disclosures of the above referenced patent applications are hereby incorporated herein in their entireties by reference. Alternatively the background of image 11 may comprise a weave or tint pattern that carries a watermark. In still another alternative embodiment, instead of having an image 11 embedded in the message, the message may contain an audio clip with the word confidential. The audio clip would be watermarked using conventional audio watermarking techniques. However, in the first embodiment described herein, the image 11 has both a human readable word "Confidential" and a digital watermark that can be read by a watermark detection and reading program.

Figure 2:
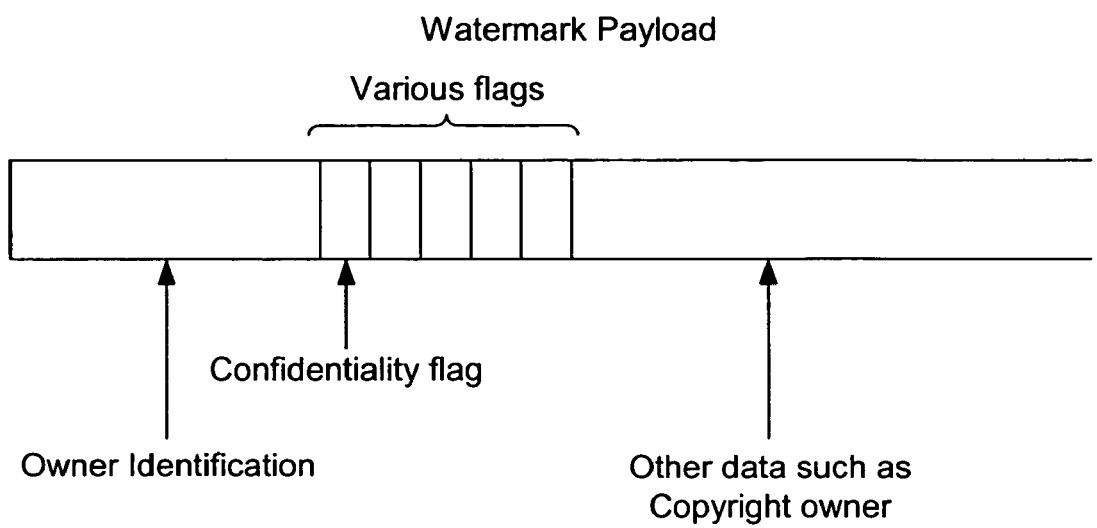
FIG. 2 is diagram of the fields in a typical watermark.

The data fields and flags in a typical watermark payload are shown in FIG. 2. It should be understood that the fields and flags shown are merely representative and they can take may alternative forms. The first embodiment of the invention utilizes one of the flag fields to indicate that a particular document is confidential. The other fields can be used in a conventional manner. Alternate embodiments can use a number of flags to indicate actions that should be taken with a particular message.

Figure 3:
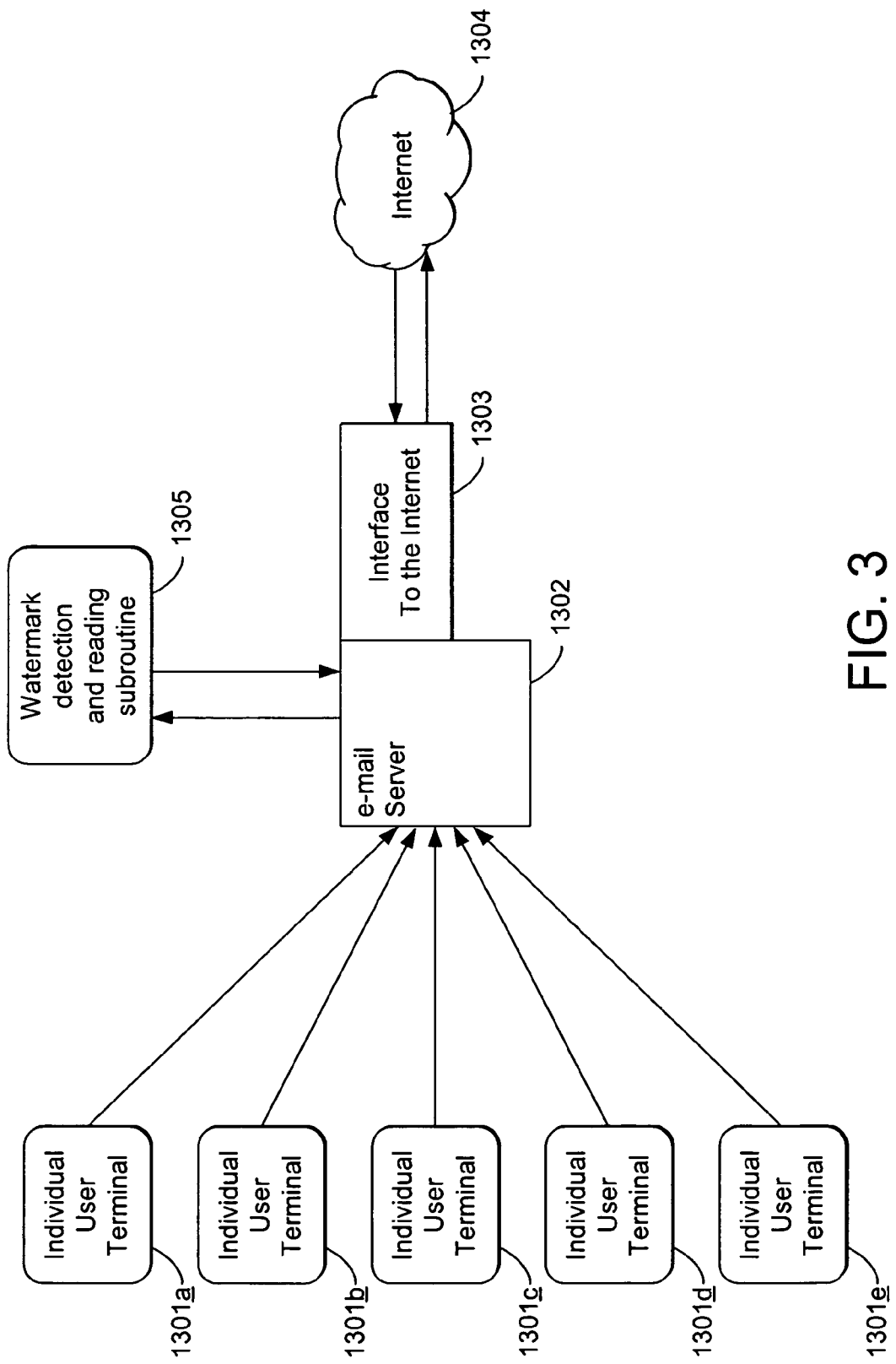
FIG. 3 is a diagram of a typical e-mail system.

FIG. 3 shows a typical e-mail system. A relatively large number of individual user terminal 301 are connected to an e-mail server 302. Only five representative terminals designated 301a to 301x are shown for convenience of illustration. The terminals 301 are connected to server 302 by conventional connections such as by an Ethernet LAN or by dial up modems. The e-mail server 302 has a conventional interface 303 to the Internet and it receives and sends messages from the individual users to the Internet. The e-mail server 302 is conventional and the details of the e-mail server 302 forms no part of the present invention. However, with the present invention, before the e-mail server 302 transmits a message from one of the individual user terminals 301a to 301x to the Internet, the e-mail server passes the message through a watermark detection and reading program 305. Both the e-mail message itself and any attached documents are passed through the watermark reading program. The watermark detection and reading program 305 determines if a message contains a watermark. If a watermark is detected, the confidentiality flag bit is interrogated. If the watermark reading program 305 determines that the flag bit is set to "confidential", the first embodiment of the invention merely informs the e-mail server 302 to return the message to the sender. Thus, the first embodiment of the invention prohibits any confidential information from being transmitted as part of an e-mail message.

Figure 4:
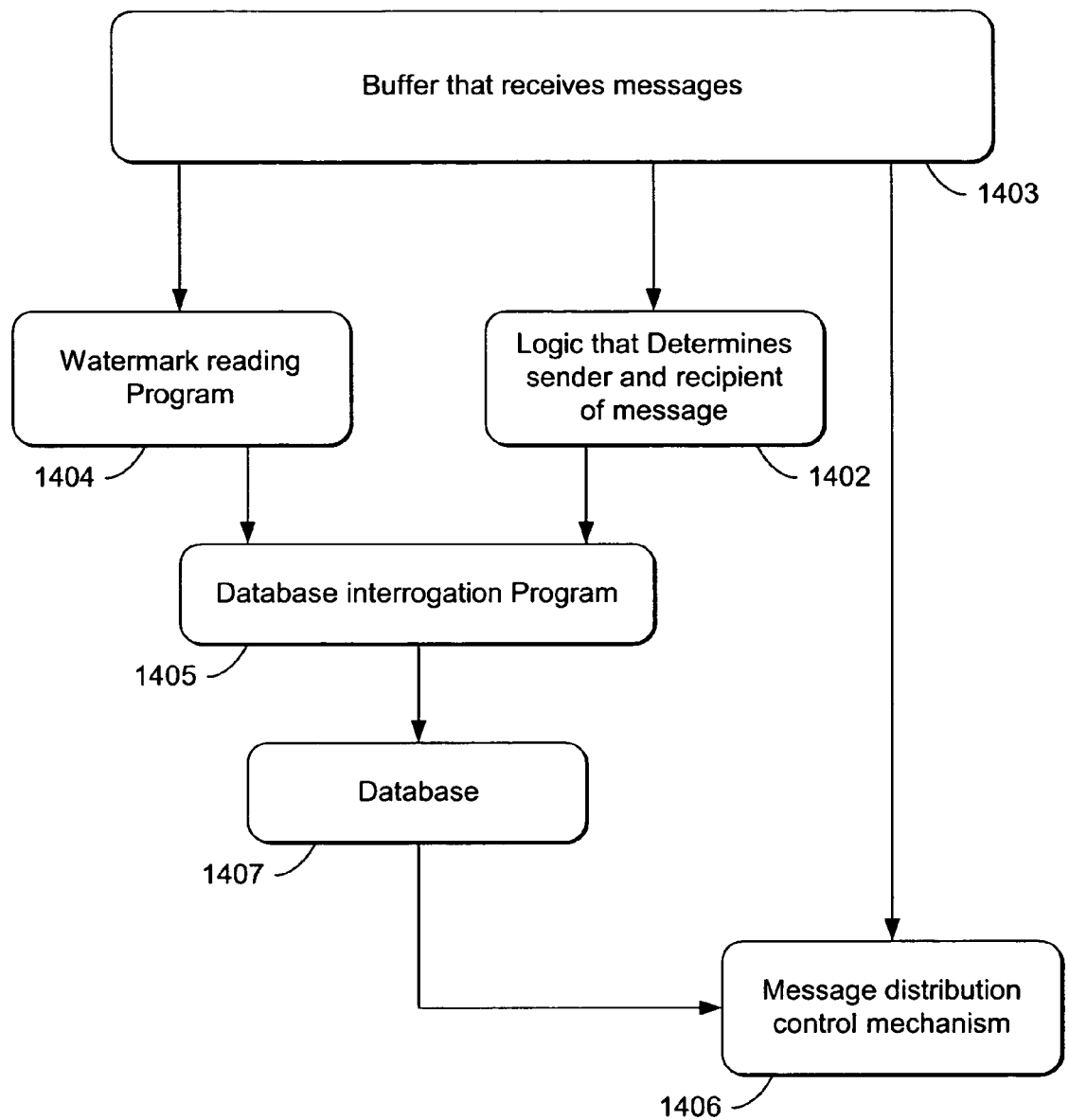
FIG. 4 is a more detailed diagram of the watermark reading and detection program shown in FIG. 3.

A second embodiment of the invention provides for a wider array of alternative. As shown in FIG. 4, the second embodiment of the invention includes a database 401. The database 401 contains a list of different potential message senders, a list showing different groups of potential message recipients, and a set of possible categories indicated by the setting of the various flags in a message. For example, the senders may fall into three groups designated sender groups S1, S2 and S3. The potential recipients can fall into three groups designated R1, R2, and R3. The database 401 and the associated logic 402 can implement logic rules such as indicated by the following table:

| Sender Group | Recipient Group | Flag Conditions | Action |
| --- | --- | --- | --- |
| S1 | R1 | 011 | Send message |
| S1 | R2 | 110 | Do not sent message notify the administrator |

-continued

| Sender Group | Recipient Group | Flag Conditions | Action |
| --- | --- | --- | --- |
| S1 | R2 | 001 | Send message, and log fact that S1 sent a message to R2. |
| S1 | R2 | 101 | Return message to sender |
| S2 | R1 | 011 | Send message |
| S2 | R3 | 110 | Do not sent message and notify the system administrator |

It should be clearly noted that the above is merely a simplified example of the rules and combinations that could be in database 401. The database could include hundreds or thousands of users and it could include dozens of rules. The system can be complex or simple as desired for a particular application. A system can include many alternatives in addition to those shown above or a system might include only a very few alternatives. For example, the system could include only a list of addresses which are authorized to receive messages which have a confidentiality flag set to "confidential". Such a system would allow confidential documents to be only sent to selected addresses. Alternatively or in addition the system could include a list of individuals authorized to send confidential documents. The system could merely check the sender against this list or alternatively, the system could require that a password be entered when such messages are encountered. The table above shows only three flag bits. A system could have more or less flag bits as the needs of the particular system require.

The import point is that the system considers the message sender, the message recipient and the condition of the flags in the data carried by a digital watermark to determine what action should be taken. The digital watermark can be carried by the message using any of the known ways of watermarking a document. For example, it can be carried by modulating the width of lines or by modulating the luminosity of pixels in an image or by a watermark in audio data.

In alternate embodiments of the invention, the confidentiality stamp could include a watermark in an image by means other than using line width modulation as described with respect to the first embodiment of the invention. The background of the stamp could include a conventional image carrying a conventional watermark.

In an alternative embodiment of the invention, rather than checking for a digital watermark, the system could check for a text string such as "confidential" and take action in response to locating such a text string.

The above described embodiments relate to controlling the dissemination of information; however, it should be understood that the invention could be applied in similar manner to control the receipt of confidential information or to control the action taken when messages containing watermarks are received.

While the previously described embodiments apply to e-mail systems, similar precautions could be taken with FTP servers or with Web servers.

While the invention has been shown and described with respect to various preferred embodiments, it should be understood that various changes in form and detail could be made without departing from the scope and spirit of the invention.

I claim:

1. An electronic messaging system including a mail server which sends and receives messages, said mail server including a watermark reading program that reads watermarks in said messages, the program operable to read watermarks in documents that form at least part of the messages and operable to read watermarks in documents attached to the messages, and the program operable to control distribution of said messages in response to data in said watermarks.

2. A system that includes an e-mail server connected to the Internet, the system comprising:
    means for transmitting messages from an individual user to said e-mail server, watermark detecting means for detecting and reading watermarks in e-mail messages at the server after the messages are sent from the user but before such messages are transmitted from said e-mail server to the Internet,
    means for preventing the transmission of messages from said e-mail server to the Internet if said watermark detecting means detects a watermark which has an indication that the message including said watermark is confidential.

3. A system for controlling the distribution of electronic messages that include confidential information, each electronic message having confidential information including a digital watermark carrying data that indicates that the message is confidential, a server which transmits and receives messages, said server including a watermark reading program that reads watermarks in messages and controls the distribution of such messages in accordance with the data carried by watermarks in the messages, the program operable to read watermarks in documents that form at least part of the messages and operable to read watermarks in documents attached to the messages.

4. The system recited in claim 3 where the messages are transmitted over the Internet.

5. A method of controlling the distribution of electronic messages that include confidential information, said messages carrying digital watermarks that carry data indicating that the message includes confidential information,
    passing messages to a watermark detecting process prior to transmission of said messages including passing documents in and attached to the messages to the watermark detecting process for detecting watermarks in the documents, and
    controlling the distribution of an electronic message which includes a watermark in response to the data carried by the watermark in the message.

6. The method recited in claim 5 wherein said messages are transmitted over the Internet.

7. The method recited in claim 5 wherein a database is interrogated to determine an action to take with a particular message based at least in part on the data carried by the watermark.

8. The method recited in claim 5 wherein the action taken with respect to a particular message is dependent on the identity of the sender, the identity of the receiver and information carried by the watermark.

9. The method recited in claim 5 wherein an action taken with respect to a particular message is dependent on the identity of the sender, the identity of the receiver, information carried by the watermark, and information stored in a database.

10. A method of transmitting electronic messages from a sender to a receiver which comprises,
    detecting and reading digital watermarks carried in such messages to determine how flags in such watermarks are set,
    interrogating a database to determine what action should be taken with a message based upon the identity of the sender, the identity of the receiver and the flag settings in the watermark in the message.

11. The method recited in claim 10 wherein said messages are transmitted over the Internet.

12. The method recited in claim 10 where the data carried by said watermark indicates if the message includes confidential information.

* * * * *